United States Patent
Wang et al.

(10) Patent No.: US 10,759,894 B2
(45) Date of Patent: Sep. 1, 2020

(54) VEGETABLE OIL-BASED CARTILAGE BIONIC CUSHIONING AND SHOCK-ABSORBING MATERIAL, AND PREPARATION METHOD AND USE THEREOF

(71) Applicant: Foshan Linzhi Polymer Materials Science and Technology Co., Ltd., Foshan (CN)

(72) Inventors: Bowei Wang, Foshan (CN); Xiaogang Wang, Foshan (CN); Keer Chen, Foshan (CN)

(73) Assignee: Foshan Linzhi Polymer Materials Science and Technology Co., Ltd. (CN)

( * ) Notice: Subject to any disclaimer, the term of this patent is extended or adjusted under 35 U.S.C. 154(b) by 0 days.

(21) Appl. No.: 16/347,930

(22) PCT Filed: Dec. 26, 2017

(86) PCT No.: PCT/CN2017/118637
§ 371 (c)(1),
(2) Date: May 7, 2019

(87) PCT Pub. No.: WO2018/086635
PCT Pub. Date: May 17, 2018

(65) Prior Publication Data
US 2019/0263959 A1    Aug. 29, 2019

(30) Foreign Application Priority Data

Nov. 8, 2016 (CN) .......................... 2016 1 0979730

(51) Int. Cl.
| | | |
|---|---|---|
| *C08G 18/48* | (2006.01) | |
| *C08G 18/32* | (2006.01) | |
| *C08G 18/63* | (2006.01) | |
| *C08G 18/36* | (2006.01) | |
| *C08G 18/66* | (2006.01) | |
| *C08G 18/40* | (2006.01) | |
| *C08G 101/00* | (2006.01) | |

(52) U.S. Cl.
CPC ......... *C08G 18/3206* (2013.01); *C08G 18/36* (2013.01); *C08G 18/4072* (2013.01); *C08G 18/4825* (2013.01); *C08G 18/632* (2013.01); *C08G 18/6696* (2013.01); *C08G 18/4804* (2013.01); *C08G 2101/0083* (2013.01); *C08G 2350/00* (2013.01)

(58) Field of Classification Search
CPC ................ C08G 18/3206; C08G 18/36; C08G 18/4072; C08G 18/4804; C08G 18/4825; C08G 18/4837; C08G 18/632; C08G 18/6696; C08G 18/73; C08G 18/7671; C08G 18/8019; C08G 2101/0058; C08G 2101/0066; C08G 2101/0083; C08G 2350/00
See application file for complete search history.

(56) References Cited

U.S. PATENT DOCUMENTS

| | | | |
|---|---|---|---|
| 8,791,168 B2 | 7/2014 | Babb et al. | |
| 8,975,335 B2 * | 3/2015 | Hager | ................ C08G 18/7664 525/123 |
| 9,029,432 B2 * | 5/2015 | Aou | ...... C08G 18/283 521/174 |
| 2005/0222361 A1 | 10/2005 | Zaschke et al. | |
| 2006/0235100 A1 * | 10/2006 | Kaushiva | ............... C08G 18/36 521/172 |
| 2012/0208912 A1 | 8/2012 | Sasaki et al. | |

FOREIGN PATENT DOCUMENTS

| | | |
|---|---|---|
| CN | 1656136 A | 8/2005 |
| CN | 102352013 A | 2/2012 |
| CN | 103897134 A | 7/2014 |
| CN | 104119490 A | 10/2014 |
| CN | 104987487 A | 10/2015 |
| CN | 106632962 A | 5/2017 |
| EP | 2074157 B1 | 2/2017 |
| WO | 2011043345 A1 | 4/2011 |

* cited by examiner

Primary Examiner — John M Cooney
(74) Attorney, Agent, or Firm — The Webb Law Firm

(57) ABSTRACT

A vegetable oil-based cartilage bionic cushioning and shock-absorbing material, and a preparation method and use thereof, is provided. The vegetable oil-based cartilage bionic cushioning and shock-absorbing material is prepared from a premix A and an isocyanate mixture B; the premix A including a vegetable oil-based modified polyol, a type 1 polyether polyol, a type 2 polyether polyol, a polymer polyol, a surfactant, a foaming agent, a chain extender, a catalyst and a cell regulator; the type 1 polyether polyol is a polyether polyol with a molecular weight of 400-1000 and a hydroxyl value of 110-280 mgKOH/g; and the type 2 polyether polyol is a polyether polyol with a molecular weight of 1000-10000 and a hydroxyl value of 25-56 mg KOH/g. The material provided by the present invention is environment-friendly and breathable with open cells, and has a high cushioning effect and a low permanent compression set value.

9 Claims, No Drawings

VEGETABLE OIL-BASED CARTILAGE BIONIC CUSHIONING AND SHOCK-ABSORBING MATERIAL, AND PREPARATION METHOD AND USE THEREOF

CROSS-REFERENCE TO RELATED APPLICATIONS

This application is the United States national phase of International Application No. PCT/CN2017/118637 filed Dec. 26, 2017, and claims priority to Chinese Patent Application No. 201610979730.X filed Nov. 8, 2016, the disclosures of each of which are hereby incorporated by reference in their entireties.

BACKGROUND OF THE INVENTION

Field of the Invention

The present invention belongs to the technical field of cushioning and shock-absorbing materials, and relates to a vegetable oil-based cartilage bionic cushioning and shock-absorbing material, in particular to a vegetable oil-based cartilage bionic cushioning and shock-absorbing material, and a preparation method and use thereof.

Description of Related Art

In modern people's life, cushioning materials are used more and more widely. The cushioning and shock-absorbing materials are required for object transport packaging, cushioned shoes, inner cushions of bags, electronic product packaging, sport protection, military protection, automobile shock absorption, and the like. The commonly used cushioning materials include foam, ethylene-vinyl acetate (EVA), POLYYOU, latex, rubber, expanded polystyrene (EPS), styrene butadiene rubber (SBR), crosslinked polyethylene (XPE) and the like. However, the SBR and the foam are too soft, the EVA and the XPE are airtight and smelly and have poor thermal stability; the POLYYOU is not stable in quality because it is made of waste and old foam materials; the latex does not have a long service life because of too fast degradation; The rubber is too heavy and airtight. The EPS is airtight and fragile and can withstand only one impact. Therefore, the market needs a breathable, comfortable and lightweight material with a high bearing capacity and an excellent cushioning performance.

SUMMARY OF THE INVENTION

In order to overcome the disadvantages and defects of the prior art, the purpose of the present invention is to provide a vegetable oil-based cartilage bionic cushioning and shock-absorbing material. The cushioning and shock-absorbing material is an ultimate cushioning material. The ultimate cushioning material refers to: supposing that the maximum percentage of the ultimate cushioning is 100%, the cushioning and energy absorption performance thereof significantly exceeds the anti-impact protection ability of ordinary cushioning materials, with more than 70%-90% of the impact force being absorbed, and the number being as close as possible to an ultimate value. This incomparable cushioning performance is referred to as ultimate cushioning. This material has the features of breathability, a high bearing capacity, comfort, a moderate density and an excellent cushioning performance, and has the advantage of environmental friendliness because it is produced by using a vegetable oil-based polyol. This material is manufactured by using a bionic technology and formed by imitating the function and structure of cartilage tissues according to the cushioning and shock-absorbing principle of the human cartilage and by chemical foaming under high-speed stirring in a mold at a specific temperature, in the existence of a vegetable oil polyol, a polyether polyol, an aliphatic isocyanate, a diol modified isocyanate, a surfactant, a catalyst and a foaming agent.

Another purpose of the present invention is to provide a method for preparing the vegetable oil-based cartilage bionic cushioning and shock-absorbing material with high cushioning performance.

Still another purpose of the present invention is to provide use of the vegetable oil-based cartilage bionic cushioning and shock-absorbing material with high cushioning performance. The prepared vegetable oil-based cartilage bionic cushioning and shock-absorbing material with high cushioning performance is applied to the fields of anti-impact protection products for human bodies, anti-falling and anti-impact protection of articles, shock absorption and anti-collision of automobiles, anti-riot, anti-bullet and anti-impact products, shock wave filtration and energy absorption of submarines and aircrafts, vibration protection of intelligent equipment, and cushioning and shock absorption of aircrafts; and the fields of anti-impact protection products for athletes, medical shock absorption and protection, shock absorption and energy absorption of floors, and anti-collision and energy absorption of walls.

The anti-impact protection products for human bodies comprise: human body protectors such as cushioned and shock-absorptive shoes, anti-impact and energy-absorptive helmets, shoulder protectors, elbow protectors, back protectors and knee protectors; the protection products for anti-falling and an-impact of articles, especially precious articles, comprise: products for anti-falling, shock absorption and energy absorption of electronic products such as mobile phones and computers, packaging and transport of precious articles, and impact protection of airdrop articles; the products for shock absorption and anti-collision for automobiles comprise: products for energy absorption during automobile collision, anti-impact protection of automobile accessories such as buffer beams, bumpers and seats, and load-bearing cushioning and shock absorption of vehicles; the equipment for military, police and civil uses comprises: products for anti-riot, anti-bullet and anti-impact, shock wave filtration and energy absorption of submarines and aircrafts, vibration protection of intelligent equipment, and cushioning and shock absorption of aircrafts; and the other categories comprise: products for anti-impact protection for athletes, medical shock absorption and protection, shock absorption and energy absorption of floors, and anti-collision and energy absorption of walls.

The purpose of the present invention is achieved by means of the following technical solution:

A vegetable oil-based cartilage bionic cushioning and shock-absorbing material is prepared from a premix A and an isocyanate mixture B;

the premix A comprises a vegetable oil-based modified polyol, a type 1 polyether polyol, a type 2 polyether polyol, a polymer polyol, a surfactant, a foaming agent, a chain extender, a catalyst and a cell regulator.

The surfactant is a silicone or polysiloxane-oxyalkylene block copolymer.

The vegetable oil-based modified polyol is an olive oil polyol, a peanut oil polyol, a rapeseed oil polyol, a cottonseed oil polyol, a soybean oil polyol, a sesame oil polyol, a sunflower seed oil polyol, a linseed oil polyol, a safflower oil polyol, a rice bran oil polyol, a corn oil polyol and a castor oil polyol, is preferably a peanut oil polyol, a soybean oil polyol and a castor oil polyol, and is further preferably a soybean oil polyol and a castor oil polyol, with a hydroxyl value of 160-220 mg KOH/g and a molecular weight of 550-4000.

The type 1 polyether polyol is a polypropylene oxide polyol with a molecular weight of 400-1000 and a hydroxyl value of 110-280 mg KOH/g.

The type 2 polyether polyol is a polypropylene oxide-ethylene oxide block copolymer polyol with a molecular weight of 1000-10000 and a hydroxyl value of 25-56 mg KOH/g.

The polymer polyol is a graft copolymer consisting of a propylene epoxide-ethylene epoxide copolyether grafting with acrylonitrile and styrene, wherein the molecular weight is 3000-10000, the functionality is 2-4, the grafting rate is 20 wt. %-60 wt. %, and the hydroxyl value is 20-30 mgKOH/g.

The foaming agent is a physical foaming agent and/or a chemical foaming agent, is preferably water or F-141B (1,1-dichloro-1-fluoroethane), and is more preferably water. Liquids with low volatilization points all can be used as the foaming agent, for example, dichloromethane and chlorofluorocarbon, but none of these is environment-friendly.

The chain extender is one or more of ethylene glycol, 1,2-propanediol, 1,3-propanediol, 1,4-butanediol, diethylene glycol, dipropylene glycol, neopentyl glycol, methyl propanediol (2-methyl-1,3-propanediol) and hydroquinone bis(2-hydroxyethyl)ether.

The catalyst is at least one of N,N-dimethylcyclohexylamine, bis(2-dimethylaminoethyl)ether, N,N,N',N'-tetramethylalkylidene diamine, triethylamine, N,N-dimethylbenzylamine, triethylenediamine and an organic bismuth catalyst.

the cell regulator is one of monofunctional polyethylene oxide and a block copolymer consisting of monofunctional polypropylene oxide and polyethylene oxide; and the molecular weight thereof is 400-1000. The reaction speed is too fast when the molecular weight is smaller than 400, and the viscosity is too high and the reaction speed is too slow when the molecular weight is higher than 1000.

The isocyanate mixture B comprises: a polyether polyol modified isocyanate and an aliphatic isocyanate.

The isocyanate in the polyether polyol modified isocyanate is one of toluene diisocyanate and diphenylmethane diisocyanate, and is preferably the diphenylmethane diisocyanate.

The polyether polyol used for modifying the isocyanate in the polyether polyol modified isocyanate preferably has a functionality of 2-3 and a molecular weight of 60-200, and further preferably has a functionality of 2 and a molecular weight of 60-120.

The aliphatic isocyanate is preferably one or more of a hexamethylene diisocyanate (HDI) and an isophorone diisocyanate (IPDI), and is further preferably the HDI.

The weight ratio of the polyether polyol modified isocyanate to the aliphatic isocyanate in the isocyanate mixture is (65-85):(15-35).

A method for preparing the polyether polyol modified isocyanate is as follows: melting the diphenylmethane diisocyanate (for example, at a temperature of 45° C.), then adding the polyether diol, rising the temperature to 70° C.-90° C. to react for 2-3 hours until the terminal—NCO group content becomes 22%-24%, and then rising the temperature to 100° C.-110° C. to react for 0.5-1 hours to form a modified diphenylmethane diisocyanate with a terminal—NCO group content of 19%-22%.

The raw materials of the cushioning and shock-absorbing material provided by the present invention further comprise additives such as an anti-aging agent, a pigment and a flame retardant.

The premix A mainly consists of the following components in parts by weight: 10-30 parts of the vegetable oil-based modified polyol, 10-40 parts of the type 1 polyether polyol, 20-60 parts of the type 2 polyether polyol, 10-30 parts of the polymer polyol, 0.1-2.0 parts of the surfactant, 0.1-1.0 parts of the foaming agent, 1.0-10.0 parts of the chain extender, 0.3-3.0 parts of the catalyst and 1-5 parts of the cell regulator. The amount of the used type 2 polyether polyol is preferably 30-60 parts.

The molar ratio of the hydroxyl group in the premix A to the isocyanate group (NCO) in the isocyanate mixture B is 100:(100-110).

The weight sum of the polyols is preferably 100 parts.

The premixed material A consists of the following components in parts by weight: 10-30 parts of the vegetable oil-based modified polyol, 10-40 parts of the type 1 polyether polyol, 30-60 parts of the type 2 polyether polyol, 10-30 parts of the polymer polyol, 0.1-2.0 parts of the surfactant, 0.1-1.0 parts of the foaming agent, 1.0-10.0 parts of the chain extender, 0.3-3.0 parts of the catalyst and 1-5 parts of the cell regulator.

A method for preparing the vegetable oil-based cartilage bionic cushioning and shock-absorbing material comprises the following steps:

(1) well mixing the vegetable oil-based modified polyol, the type 1 polyether polyol, the type 2 polyether polyol, the polymer polyol, the foaming agent, the chain extender, the catalyst and the cell regulator to obtain the premix A; and (2) mixing the premix A and the isocyanate mixture B at a high speed, putting the mixture thus obtained into a mold for molding, and leaving the mixture to stand to obtain the cushioning and shock-absorbing material with a high cushioning performance.

Said mixing the premix A and the isocyanate mixture B at a high speed is carried out at a speed of 300-10000 rpm for 0.1-45 seconds; the premix A and the isocyanate mixture B are preheated at 18° C.-40° C.; said molding is carried out at 30° C.-70° C. for 3-45 minutes, and the standing lasts for 1-12 hours The cushioning and shock-absorbing material provided by the present invention has a density of 0.1-0.9 g/cm$^3$ and a hardness of Shore A 10 to Shore C 90; and the permanent compression set thereof is no more than 5%. The material has an open cell structure, and the cushioning performance is tested according to the EN1621-2 standard method, wherein an impact force peak value in a 25 MM thickness does not exceed 18000 N.

The vegetable oil-based cartilage bionic cushioning and shock-absorbing material is applied to the fields of shoe pads, protective pads, knee pads, protective clothing, object transport packaging, cushioned shoes, inner cushions of bags, electronic product packaging, sport protection, military protection, automobile shock absorption, and the like.

In the present invention, artificial cartilage foam is produced by means of principles and experiments of bionics, polymer chemistry, biomechanics. A chemical reaction is carried out between a liquid extracted from the petroleum and a liquid extracted from the plant, wherein the structure of the liquid is made to be close to the structure of cartilage tissues in the configuration and reaction process by guiding and controlling parameters such as the density, hardness, tension, resilience and structure and the liquid is converted into to a solid state. When there is an external impact force, the energy generated by the impact is dissipated and absorbed by means of friction, bending (or torsion), elastoplastic (or viscoelastic) hysteresis deformation within the material, and then converted into heat energy, which is released slowly to prolong the speed change time, so as to achieve the purpose of reducing the impact force as far as possible.

The human cartilage is a dense gelatinous substance with certain hardness and elasticity, and has the functions of porous permeation and gradient. An intermediate layer of gradient layers has certain strength and toughness, can bear an impact and a load, and can absorb vibration energy. In the present invention, the porous structure in the cartilage is combined with the intermediate layer of the gradient layers by means of the bionic means, and a cushioning and shock-absorbing material with high cushioning performance is prepared by combining an appropriate pore structure and an excellent performance reflected by each raw material in the material. In a specific pore structure (with certain porosity), the soft segment and the hard segment in the molecular chain of the material are combined with each, so that impact and load bearing effects of the material are relatively better.

Compared with the prior art, the present invention has the following advantages and beneficial effects:

1. The material is produced by using vegetable oil polyols and thus has the advantage of environmental friendliness.

2. The material has a high cushioning effect, a wide applicable temperature range and good low-temperature compliance, and is applicable to multiple cases in which the high cushioning effect is maintained.

3. The material is breathable with open cells, and has the features of heat dissipation, breathability and anti-bacteria in the production of sports products;

4. The material has a low compression set, good thermal stability, a stable size and durability.

DETAILED DESCRIPTION

The present invention will be further described below in detail in combination with specific embodiments, but the embodiments of the present invention are not limited thereto. For unspecified process parameters, reference can be made to the conventional techniques.

In examples 1-12:

The vegetable oil-based polyol is a soybean oil polyol HM10200 produced by Guangzhou HAIRMA Vegetable Oil and Fat Co., Ltd., with a hydroxyl value of 200 mg KOH/g and a molecular weight of 3700.

The type 1 polyether polyol is polypropylene glycol PPG-1000 produced by Jiangsu Haian Petrochemical Plant, with a hydroxyl value of 112 mg KOH/g.

The type 2 polyether polyol is polyether polyol CHE-330N produced by Jiangsu Changhua Polyurethane Co., Ltd., with a hydroxyl value of 35 mg KOH/g.

The polymer polyol is polymer polyol CHP-H30 produced by Jiangsu Changhua Polyurethane Co., Ltd., with a hydroxyl value of 27 mg KOH/g.

The chain extender is ethylene glycol produced by BASF. The silicone surfactant is Y10366 produced by Momentive Performance Materials Inc., USA.

The catalyst is a mixture of a solution obtained by dissolving bis(2-dimethylaminoethyl)ether of which the weight percentage thereof is 70 wt. % in the dipropylene glycol and a solution obtained by dissolving triethylenediamine of which the weight percentage thereof is 33 wt. % in the dipropylene glycol. The weight ratio of the bis(2-dimethylaminoethyl)ether to the triethylenediamine is 0.05:0.5.

The cell regulator is a block copolymer of a monofunctional polypropylene oxide with a polyethylene oxide, with a molecular weight of 500 and an ethylene oxide content of 60%.

A method for preparing the polyether polyol modified isocyanate is as follows: melting the diphenylmethane diisocyanate at a temperature of 45° C., then adding the PPG-400, rising the temperature to 70° C.-90° C. to react for 2-3 hours until the terminal—NCO group content becomes 22%-24%, and then rising the temperature to 100° C.-110° C. to react for 0.5-1 hours to form a modified diphenylmethane diisocyanate with a terminal—NCO group content of 21.8%.

The HDI is 50M-HDI produced by Japan TOSOH NPU, with the —NCO group content of 49.9%.

Example 1

A method for preparing a vegetable oil-based cartilage bionic cushioning and shock-absorbing material with high cushioning performance specifically comprises the following steps:

(1) well mixing 10 parts by weight of the vegetable oil-based polyol, 40 parts by weight of the type 1 polyether polyol, 40 parts by weight of the type 2 polyether polyol, 10 parts by weight of the polymer polyol, 0.1 parts by weight of water, 0.1 parts by weight of the silicone surfactant, 1.0 part by weight of the ethylene glycol, 1.2 parts by weight of the catalyst, and 5 parts by weight of the cell regulator to obtain a premix A, and maintaining the temperature at 40° C.;

(2) mixing the polyether polyol modified isocyanate and hexamethylene diisocyanate at a weight ratio of 65:35 to form an isocyanate mixture B, and maintaining the temperature at 40° C.; and (3) well mixing the premix A and the isocyanate mixture B at a molar ratio 100:100 of —OH to —NCO in a high speed (the high-speed mixing revolving speed is 10000 rpm, and the mixing time is 0.1 seconds), then putting the mixture into a mold for molding (the molding temperature is 70° C., and the molding time is 3 minutes), and leaving the mixture to stand for 4 hours at room temperature to obtain the cushioning and shock-absorbing material with high cushioning performance, wherein the performance parameters thereof are shown in Table 1.

Example 2

A method for preparing a vegetable oil-based cartilage bionic cushioning and shock-absorbing material with high cushioning performance specifically comprises the following steps:

(1) well mixing 20 parts by weight of the vegetable oil-based polyol, 30 parts by weight of the type 1 polyether polyol, 40 parts by weight of the type 2 polyether polyol, 10 parts by weight of the polymer polyol, 0.1 parts by weight of water, 0.1 parts by weight of the silicone surfactant, 1.0 part by weight of the ethylene glycol, 1.2 parts by weight of the catalyst, and 5 parts by weight of the cell regulator to obtain a premix A, and maintaining the temperature at 40° C.;

(2) mixing the polyether polyol modified isocyanate and hexamethylene diisocyanate at a weight ratio of 65:35 to form an isocyanate mixture B, and maintaining the temperature at 40° C.; and (3) well mixing the premix A and the isocyanate mixture B at a ratio 100:100 of —OH to —NCO in a high speed (the high-speed mixing revolving speed is 10000 rpm, and the mixing time is 0.1 seconds), then putting the mixture into a mold for molding (the molding temperature is 70° C., and the molding time is 3 minutes), and leaving the mixture to stand for 4 hours at room temperature to obtain the cushioning and shock-absorbing material with high cushioning performance, wherein the performance parameters thereof are shown in Table 1.

Example 3

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 40 parts by weight of the type 2 polyether polyol, 10 parts by weight of the polymer polyol, 0.1 parts by weight of water, 0.1 parts by weight of the silicone surfactant, 1.0 part by weight of the ethylene glycol, 1.2 parts by weight of the catalyst, and 5 parts by weight of the cell regulator to obtain a premix A, and maintaining the temperature at 40° C.;

(2) mixing the polyether polyol modified isocyanate and hexamethylene diisocyanate at a weight ratio of 65:35 to form an isocyanate mixture B, and maintaining the temperature at 40° C.; and (3) well mixing the premix A and the isocyanate mixture B at a ratio 100:100 of —OH to —NCO in a high speed (the high-speed mixing revolving speed is 10000 rpm, and the mixing time is 0.1 seconds), then putting the mixture into a mold for molding (the molding temperature is 70° C., and the molding time is 3 minutes), and leaving the mixture to stand for 4 hours at room temperature to obtain the cushioning and shock-absorbing material with high cushioning performance, wherein the performance parameters thereof are shown in Table 1.

Example 4

A method for preparing a vegetable oil-based cartilage bionic cushioning and shock-absorbing material with high cushioning performance specifically comprises the following steps:

(1) well mixing 20 parts by weight of the vegetable oil-based polyol, 20 parts by weight of the type 1 polyether polyol, 30 parts by weight of the type 2 polyether polyol, 30 parts by weight of the polymer polyol, 0.5 parts by weight of water, 0.8 parts by weight of the silicone surfactant, 3.0 part by weight of the ethylene glycol, 0.6 parts by weight of the catalyst, and 3.0 parts by weight of the cell regulator to obtain a premix A, and maintaining the temperature at 35° C.;

(2) mixing the polyether polyol modified isocyanate and hexamethylene diisocyanate at a weight ratio of 75:25 to form an isocyanate mixture B, and maintaining the temperature at 35° C.; and (3) well mixing the premix A and the isocyanate mixture B at a ratio 100:105 of —OH to —NCO in a high speed (the high-speed mixing revolving speed is 5000 rpm, and the mixing time is 0.2 seconds), then putting the mixture into a mold for molding (the molding temperature is 60° C., and the molding time is 7 minutes), and leaving the mixture to stand for 5 hours at room temperature to obtain the cushioning and shock-absorbing material with high cushioning performance, wherein the performance parameters thereof are shown in Table 1.

Example 5

A method for preparing a vegetable oil-based cartilage bionic cushioning and shock-absorbing material with high cushioning performance specifically comprises the following steps:

(1) well mixing 20 parts by weight of the vegetable oil-based polyol, 20 parts by weight of the type 1 polyether polyol, 40 parts by weight of the type 2 polyether polyol, 20 parts by weight of the polymer polyol, 0.5 parts by weight of water, 0.8 parts by weight of the silicone surfactant, 3.0 part by weight of the ethylene glycol, 0.6 parts by weight of the catalyst, and 3.0 parts by weight of the cell regulator to obtain a premix A, and maintaining the temperature at 35° C.;

(2) mixing the polyether polyol modified isocyanate and hexamethylene diisocyanate at a weight ratio of 75:25 to form an isocyanate mixture B, and maintaining the temperature at 35° C.; and (3) well mixing the premix A and the isocyanate mixture B at a ratio 100:105 of —OH to —NCO in a high speed (the high-speed mixing revolving speed is 5000 rpm, and the mixing time is 0.2 seconds), then putting the mixture into a mold for molding (the molding temperature is 60° C., and the molding time is 7 minutes), and leaving the mixture to stand for 5 hours at room temperature to obtain the cushioning and shock-absorbing material with high cushioning performance, wherein the performance parameters thereof are shown in Table 1.

Example 6

A method for preparing a vegetable oil-based cartilage bionic cushioning and shock-absorbing material with high cushioning performance specifically comprises the following steps:

(1) well mixing 20 parts by weight of the vegetable oil-based polyol, 20 parts by weight of the type 1 polyether polyol, 50 parts by weight of the type 2 polyether polyol, 10 parts by weight of the polymer polyol, 0.5 parts by weight of water, 0.8 parts by weight of the silicone surfactant, 3.0 part by weight of the ethylene glycol, 0.6 parts by weight of the catalyst, and 3.0 parts by weight of the cell regulator to obtain a premix A, and maintaining the temperature at 35° C.;

(2) mixing the polyether polyol modified isocyanate and hexamethylene diisocyanate at a weight ratio of 75:25 to form an isocyanate mixture B, and maintaining the temperature at 35° C.; and (3) well mixing the premix A and the isocyanate mixture B at a ratio 100:105 of —OH to —NCO in a high speed (the high-speed mixing revolving speed is 5000 rpm, and the mixing time is 0.2 seconds), then putting the mixture into a mold for molding (the molding temperature is 60° C., and the molding time is 8 minutes), and leaving the mixture to stand for 5 hours at room temperature to obtain the cushioning and shock-absorbing material with high cushioning performance, wherein the performance parameters thereof are shown in Table 1.

Example 7

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 30 parts by weight of the type 2 polyether polyol, 20 parts by weight of the polymer polyol, 0.8 parts by weight of water, 2.0 parts by weight of the silicone surfactant, 5.0 part by weight of the ethylene glycol, 0.3 parts by weight of the catalyst, and 2.0 parts by weight of the cell regulator to obtain a premix A, and maintaining the temperature at 20° C.;

(2) mixing the polyether polyol modified isocyanate and hexamethylene diisocyanate at a weight ratio of 85:15 to form an isocyanate mixture B, and maintaining the temperature at 20° C.; and (3) well mixing the premix A and the isocyanate mixture B at a ratio 100:110 of —OH to —NCO in a high speed (the high-speed mixing revolving speed is 300 rpm, and the mixing time is 45 seconds), then putting the mixture into a mold for molding (the molding temperature is 30° C., and the molding time is 45 minutes), and leaving the mixture to stand for 12 hours at room temperature to obtain the cushioning and shock-absorbing material with high cushioning performance, wherein the performance parameters thereof are shown in Table 1.

Example 8

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 35 parts by weight of the type 2 polyether polyol, 15 parts by weight of the polymer polyol, 0.8 parts by weight of water, 2.0 parts by weight of the silicone surfactant, 5.0 part by weight of the ethylene glycol, 0.3 parts by weight of the catalyst, and 2.0 parts by weight of the cell regulator to obtain a premix A, and maintaining the temperature at 20° C.;

(2) mixing the polyether polyol modified isocyanate and hexamethylene diisocyanate at a weight ratio of 85:15 to form an isocyanate mixture B, and maintaining the temperature at 20° C.; and (3) well mixing the premix A and the isocyanate mixture B at a ratio 100:110 of —OH to —NCO in a high speed (the high-speed mixing revolving speed is 300 rpm, and the mixing time is 45 seconds), then putting the mixture into a mold for molding (the molding temperature is 30° C., and the molding time is 45 minutes), and leaving the mixture to stand for 12 hours at room temperature to obtain the cushioning and shock-absorbing material with high cushioning performance, wherein the performance parameters thereof are shown in Table 1.

Example 9

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 20 parts by weight of the type 2 polyether polyol, 30 parts by weight of the polymer polyol, 0.8 parts by weight of water, 2.0 parts by weight of the silicone surfactant, 5.0 part by weight of the ethylene glycol, 0.3 parts by weight of the catalyst, and 2.0 parts by weight of the cell regulator to obtain a premix A, and maintaining the temperature at 20° C.;

(2) mixing the polyether polyol modified isocyanate and hexamethylene diisocyanate at a weight ratio of 85:15 to form an isocyanate mixture B, and maintaining the temperature at 20° C.; and (3) well mixing the premix A and the isocyanate mixture B at a ratio 100:110 of —OH to —NCO in a high speed (the high-speed mixing revolving speed is 300 rpm, and the mixing time is 45 seconds), then putting the mixture into a mold for molding (the molding temperature is 30° C., and the molding time is 45 minutes), and leaving the mixture to stand for 12 hours at room temperature to obtain the cushioning and shock-absorbing material with high cushioning performance, wherein the performance parameters thereof are shown in Table 1.

Example 10

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 20 parts by weight of the type 2 polyether polyol, 30 parts by weight of the polymer polyol, 1.0 part by weight of water, 1.2 parts by weight of the silicone surfactant, 2.0 part by weight of the ethylene glycol, 2.0 parts by weight of the catalyst, and 4.0 parts by weight of the cell regulator to obtain a premix A, and maintaining the temperature at 18° C.;

(2) mixing the polyether polyol modified isocyanate and hexamethylene diisocyanate at a weight ratio of 70:30 to form an isocyanate mixture B, and maintaining the temperature at 18° C.; and (3) well mixing the premix A and the isocyanate mixture B at a ratio 100:103 of —OH to —NCO in a high speed (the high-speed mixing revolving speed is 800 rpm, and the mixing time is 22 seconds), then putting the mixture into a mold for molding (the molding temperature is 40° C., and the molding time is 25 minutes), and leaving the mixture to stand for 4 hours at room temperature to obtain the cushioning and shock-absorbing material with high cushioning performance, wherein the performance parameters thereof are shown in Table 1.

Example 11

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 20 parts by weight of the type 2 polyether polyol, 30 parts by weight of the polymer polyol, 1.0 part by weight of water, 1.2 parts by weight of the silicone surfactant, 2.0 part by weight of the ethylene glycol, 2.0 parts by weight of the catalyst, and 4.0 parts by weight of the cell regulator to obtain a premix A, and maintaining the temperature at 18° C.;

(2) mixing the polyether polyol modified isocyanate and hexamethylene diisocyanate at a weight ratio of 70:30 to form an isocyanate mixture B, and maintaining the temperature at 18° C.; and (3) well mixing the premix A and the isocyanate mixture B at a ratio 100:105 of —OH to —NCO in a high speed (the high-speed mixing revolving speed is 800 rpm, and the mixing time is 22 seconds), then putting the mixture into a mold for molding (the molding temperature is 40° C., and the molding time is 30 minutes), and leaving the mixture to stand for 6 hours at room temperature to obtain the cushioning and shock-absorbing material with high cushioning performance, wherein the performance parameters thereof are shown in Table 1.

Example 12

A method for preparing a vegetable oil-based cartilage bionic cushioning and shock-absorbing material with high cushioning performance specifically comprises the following steps:

(1) well mixing 30 parts by weight of the vegetable oil-based polyol, 20 parts by weight of the type 1 polyether polyol, 20 parts by weight of the type 2 polyether polyol, 30 parts by weight of the polymer polyol, 1.0 part by weight of water, 1.2 parts by weight of the silicone surfactant, 2.0 part by weight of the ethylene glycol, 2.0 parts by weight of the catalyst, and 4.0 parts by weight of the cell regulator to obtain a premix A, and maintaining the temperature at 18° C.;

(2) mixing the polyether polyol modified isocyanate and hexamethylene diisocyanate at a weight ratio of 70:30 to form an isocyanate mixture B, and maintaining the temperature at 18° C.; and (3) well mixing the premix A and the isocyanate mixture B at a ratio 100:108 of —OH to —NCO in a high speed (the high-speed mixing revolving speed is 800 rpm, and the mixing time is 22 seconds), then putting the mixture into a mold for molding (the molding temperature is 40° C., and the molding time is 32 minutes), and leaving the mixture to stand for 8 hours at room temperature to obtain the cushioning and shock-absorbing material with high cushioning performance, wherein the performance parameters thereof are shown in Table 1.

Performance tests of the cushioning materials in examples 1-12 and the prior art:

1. The breathability is measured by a Gurley tester, specifically, the material is cut into a 50 MM-thick specimen sheet which is then placed on a closed exhaust port of the device, compressed air of certain pressure is applied thereto, and the breathability of the material is determined according to the air block-up situation, wherein the material breathability is generally represented by three results, i.e., an open cell, a semi-open cell and a closed cell, the open cell represents good material breathability, the semi-open cell represents ordinary material breathability, and the closed cell represents material non-breathability.

2. The hardness is tested by using the ASTM D2240 method, wherein the test is respectively performed at a temperature of 23° C., 0° C. and −10° C., the humidity is 60%, the unit of the test value is Asker C-type, a test value of the test on glass is 100.

3. The compression set is tested according to the ASTM D395-B method, wherein the specimen is compressed by 50% in a thickness direction, and kept in a condition with a temperature of 70° C. and humidity of 50% for 22 hours, compressive stress release is performed for 30 minutes at room temperature, then the thickness thereof is measured and the compression set thereof is calculated according to the following formula:

compression set=(original specimen thickness−thickness after compression processing)/original specimen thickness*100%

4. The cushioning performance is tested by using a test method and device of the EN1621-2 standard, wherein the thickness of the specimen material is 13 MM, the length*width size is 35*25 CM; and the test condition is as follows: 23° C.±2° C. and the humidity of 60%. Herein, the index value, i.e., the impact force peak value indicating the cushioning performance, is explained as follows: when an object of a weight of about 5 KG falls from a certain height onto the specimen material, an impact energy of 50 KN is generated, and the impact force received by an electronic stress sensor below the specimen after cushioning and shock absorption performed by the specimen material is referred to as the impact force peak value, of which the unit thereof is N. A smaller peak value represents a better cushioning and energy absorption effect of the material.

TABLE 1

Performance test results of the vegetable oil-based cartilage bionic cushioning and shock-absorbing materials prepared in examples 1-12

| | Breathability | Compression set % | Hardness 23° C. | 0° C. | −10° C. | Impact force peak value N |
|---|---|---|---|---|---|---|
| Example 1 | Breathable | 3.7 | 25 | 28 | 35 | 13155 |
| Example 2 | Breathable | 3.9 | 24 | 27 | 34 | 13280 |
| Example 3 | Breathable | 4.2 | 23 | 25 | 33 | 13850 |
| Example 4 | Breathable | 4.3 | 35 | 43 | 53 | 13005 |
| Example 5 | Breathable | 4.5 | 32 | 40 | 50 | 13201 |
| Example 6 | Breathable | 4.5 | 30 | 38 | 48 | 14025 |
| Example 7 | Breathable | 4.8 | 40 | 48 | 58 | 12105 |
| Example 8 | Breathable | 4.9 | 40 | 48 | 59 | 11850 |
| Example 9 | Breathable | 4.9 | 42 | 50 | 61 | 11505 |
| Example 10 | Breathable | 4.6 | 28 | 35 | 45 | 14550 |
| Example 11 | Breathable | 4.7 | 30 | 38 | 48 | 14500 |
| Example 12 | Breathable | 4.6 | 35 | 43 | 53 | 13800 |

TABLE 2

Performance test data of the existing cushioning materials

| Existing cushioning materials | Breathability | Compression set % | Hardness 23° C. | Hardness 0° C. | Hardness −10° C. | Impact force peak value N |
|---|---|---|---|---|---|---|
| EVA | Cell-closed | 42.8 | 40 | 55 | 70 | 30305 |
| POLYYOU | Breathable | 15.5 | 25 | 32 | 40 | 30210 |
| Sponge | Breathable | 22.1 | 18 | 25 | 33 | 35008 |
| Rubber | Cell-closed | 6.8 | 35 | 50 | 65 | 28501 |
| XPE | Cell-closed | 41.5 | 32 | 45 | 60 | 29151 |
| Latex | Breathable | 28.1 | 25 | 35 | 45 | 33105 |
| SBR | Cell-closed | 38.1 | 18 | 30 | 50 | 32158 |
| EPS | Cell-closed | 45.1 | 60 | 85 | 95 | 24085 |

It can be seen from the comparison between Table 1 and Table 2 that the cushioning material produced in the present invention has the following advantages:

1. The material has an excellent cushioning effect, a wide applicable temperature range and good low-temperature compliance, and is applicable to multiple cases in which the high cushioning effect is maintained.

2. The material is breathable with open cells, and has the features of heat dissipation, breathability and anti-bacteria in the production of sports products.

3. The material has a low compression set, good thermal stability, a stable size and durability.

The above examples of the present invention are merely examples used for clearly describing the present invention, instead of limiting the implementation modes of the present invention. For one skilled in the art, other forms of changes or variations may also be made on the basis of the above description. There is no need and no way to exhaust all implementation modes here. Within the spirit and principle of the present invention, any modifications, equivalent replacements, improvements, etc., shall be included within the scope of protection of the present invention.

The invention claimed is:

1. A vegetable oil-based cartilage bionic cushioning and shock-absorbing material prepared from raw materials comprising a premix A and an isocyanate mixture B;

the premix A comprising a vegetable oil-based modified polyol, a type 1 polyether polyol, a type 2 polyether polyol, a polymer polyol, a surfactant, a foaming agent, a chain extender, a catalyst and a cell regulator;

wherein the vegetable oil-based modified polyol is one or more of a soybean oil polyol and a castor oil polyol with a hydroxyl value of 160-220 mg KOH/g and a molecular weight of 550-4000; the type 1 polyether polyol is a polyether polyol with a molecular weight of 400-1000 and a hydroxyl value of 110-280 mg KOH/g; the type 2 polyether polyol is a polyether polyol with a molecular weight of 1000-10000 and a hydroxyl value of 25-56 mg KOH/g; the polymer polyol is a graft copolymer consisting of a propylene epoxide-ethylene epoxide copolyether grafting with acrylonitrile and styrene; the foaming agent is water or 1,1-dichloro-1-fluoroethane;

the isocyanate mixture B comprising a polyether polyol modified isocyanate and an aliphatic isocyanate;

wherein the isocyanate in the polyether polyol modified isocyanate is one of toluene diisocyanate and diphenylmethane diisocyanate; the polyether polyol used for modifying the isocyanate in the polyether polyol modified isocyanate has a functionality of 2-3 and a molecular weight of 60-200; the aliphatic isocyanate is one or more of hexamethylene diisocyanate and isophorone diisocyanate; the weight ratio of the polyether polyol modified isocyanate to the aliphatic isocyanate in the isocyanate mixture B is (65-85):(15-35); and wherein the polyether polyol modified isocyanate is prepared by melting the diphenylmethane diisocyanate, then adding the polyether diol, increasing the temperature to 70° C.-90° C. to react for 2-3 hours until the terminal-NCO group content becomes 22%-24%, and then increasing the temperature to 100° C-110° C. to react for 0.5-1 hours to form a modified diphenylmethane diisocyanate with a terminal-NCO group content of 19%-22%.

2. The vegetable oil-based cartilage bionic cushioning and shock-absorbing material according to claim 1, wherein the type 1 polyether polyol is a polypropylene oxide polyol;

the type 2 polyether polyol is a polypropylene oxide-ethylene oxide block copolymer polyol; and the polymer polyol has a molecular weight of 3000-10000, a functionality of 2-4, a grafting rate of 20 wt. %-60 wt. %, and a hydroxyl value of 20-30 mg KOH/g.

3. The vegetable oil-based cartilage bionic cushioning and shock-absorbing material according to claim 1, wherein the surfactant is a silicone or polysiloxane-oxyalkylene block copolymer.

4. The vegetable oil-based cartilage bionic cushioning and shock-absorbing material according to claim 1, wherein the foaming agent is a physical foaming agent and/or a chemical foaming agent;

the chain extender is one or more of ethylene glycol, 1,2-propanediol, 1,3-propanediol, 1,4-butanediol, diethylene glycol, dipropylene glycol, neopentyl glycol, methyl propanediol (2-methyl-1,3-propanediol) and hydroquinone bis(2-hydroxyethyl)ether;

the catalyst is at least one of N,N-dimethylcyclohexylamine, bis(2-dimethylaminoethyl)ether, N,N,N',N'-tetramethylalkylidene diamine, triethylamine, N,N-dimethylbenzylamine, triethylenediamine and an organic bismuth catalyst;

the cell regulator is one of monofunctional polyethylene oxide and a block copolymer consisting of monofunctional polypropylene oxide and polyethylene oxide; and the molecular weight thereof is 400-1000.

5. The vegetable oil-based cartilage bionic cushioning and shock-absorbing material according to claim 1, wherein the premix A mainly consists of the following components in parts by weight: 10-30 parts of the vegetable oil-based modified polyol, 10-40 parts of the type 1 polyether polyol, 20-60 parts of the type 2 polyether polyol, 10-30 parts of the polymer polyol, 0.1-2.0 parts of the surfactant, 0.1-1.0 parts of the foaming agent, 1.0-10.0 parts of the chain extender, 0.3-3.0 parts of the catalyst and 1-5 parts of the cell regulator; and the molar ratio of the hydroxyl group in the premix A to the isocyanate group in the isocyanate mixture B is 100:(100-110).

6. A method for preparing the vegetable oil-based cartilage bionic cushioning and shock-absorbing material according to claim 1, comprising:

(1) mixing the vegetable oil-based modified polyol, the type 1 polyether polyol, the type 2 polyether polyol, the polymer polyol, the foaming agent, the chain extender, the catalyst and the cell regulator to obtain the premix A; and (2) mixing the premix A and the isocyanate mixture B at a high speed, putting the mixture thus obtained into a mold for molding, and leaving the mixture to stand to obtain the cushioning and shock-absorbing material with a high cushioning performance.

7. The method for preparing the vegetable oil-based cartilage bionic cushioning and shock-absorbing material according to claim 6, wherein said mixing the premix A and the isocyanate mixture B at a high speed is carried out at a speed of 300-10000 rpm for 0.1-45 seconds; the premix A and the isocyanate mixture B are preheated at 18° C.-40° C.; said molding is carried out at 30° C-70° C. for 3-45 minutes, and the standing lasts for 1-12 hours.

8. The method for preparing the cushioning and shock-absorbing material with high cushioning performance according to claim 7, wherein the cushioning and shock-absorbing material with high cushioning performance has a density of 0.1-0.9 g/cm$^3$ and a hardness of Shore A 10 to Shore C 90; and the permanent compression set thereof is no more than 5%.

9. Anti-impact protection products for human bodies, anti-falling and anti-impact protection of articles, shock absorption and anti-collision protection of automobiles, anti-riot products, anti-bullet products, anti-impact products, shock wave filtration and energy absorption protection of submarines and aircrafts, vibration protection of intelligent equipment, cushioning and shock absorption protection of aircrafts, anti-impact protection products for athletes, shock absorption and protection of medical products, shock absorption and energy absorption protection of floors, or anti-collision and energy absorption protection of walls, comprising the vegetable oil-based cartilage bionic cushioning and shock-absorbing material according to claim 1.

* * * * *

UNITED STATES PATENT AND TRADEMARK OFFICE
CERTIFICATE OF CORRECTION

PATENT NO. : 10,759,894 B2  
APPLICATION NO. : 16/347930  
DATED : September 1, 2020  
INVENTOR(S) : Bowei Wang et al.

Page 1 of 1

It is certified that error appears in the above-identified patent and that said Letters Patent is hereby corrected as shown below:

On the Title Page

Column 2, Item (57) ABSTRACT, Line 11, delete "mgKOH/g;" and insert -- mg KOH/g; --

In the Claims

Column 16, Line 6, Claim 8, delete "claim 7," and insert -- claim 6, --

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*